(12) United States Patent
Williams

(10) Patent No.: US 7,350,619 B2
(45) Date of Patent: Apr. 1, 2008

(54) AUXILIARY POWER UNIT EXHAUST DUCT WITH MUFFLER INCORPORATING AN EXTERNALLY REPLACEABLE ACOUSTIC LINER

(75) Inventor: Nicholas A. Williams, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 511 days.

(21) Appl. No.: 10/999,887

(22) Filed: Nov. 30, 2004

(65) Prior Publication Data

US 2006/0060417 A1 Mar. 23, 2006

Related U.S. Application Data

(60) Provisional application No. 60/612,675, filed on Sep. 23, 2004.

(51) Int. Cl.
*B64D 33/02* (2006.01)

(52) U.S. Cl. .............. 181/214; 181/217; 181/210; 181/211; 181/212; 181/216; 181/241; 181/243; 244/53 B; 244/1 N; 60/766; 60/752; 60/796

(58) Field of Classification Search ............ 181/217, 181/210, 214, 212, 211, 216, 241, 243; 244/1 N, 244/53 B; 60/766, 752, 796
See application file for complete search history.

(56) References Cited

U.S. PATENT DOCUMENTS

| | | | | |
|---|---|---|---|---|
| 2,988,302 A * | 6/1961 | Smith | .................. | 244/15 |
| 3,215,172 A * | 11/1965 | Ardoin | .................. | 181/220 |
| 3,227,240 A * | 1/1966 | Lee et al. | .................. | 181/217 |
| 3,575,260 A * | 4/1971 | Urguhart et al. | .................. | 181/216 |
| 3,611,726 A * | 10/1971 | Medawar | .................. | 60/264 |
| 4,137,992 A * | 2/1979 | Herman | .................. | 181/213 |
| 4,353,516 A * | 10/1982 | Soligny et al. | .................. | 244/110 B |
| 4,421,202 A * | 12/1983 | Hoy | .................. | 181/252 |
| 4,759,178 A | 7/1988 | Joy | | |
| 4,864,812 A | 9/1989 | Rodgers et al. | | |
| 4,909,346 A * | 3/1990 | Torkelson | .................. | 181/213 |
| 5,097,656 A | 3/1992 | Napier | | |
| 5,127,602 A * | 7/1992 | Batey et al. | .................. | 244/1 N |
| 5,162,620 A | 11/1992 | Ross et al. | | |

(Continued)

FOREIGN PATENT DOCUMENTS

EP 1 010 618 A2 6/2000

(Continued)

OTHER PUBLICATIONS

PCT International Search Report PCT/US2005/034188, Feb. 1, 2006.

*Primary Examiner*—Lincoln Donovan
*Assistant Examiner*—Forrest Phillips
(74) *Attorney, Agent, or Firm*—Ingrassia Fisher & Lorenz

(57) ABSTRACT

Methods and apparatus are provided for an exhaust duct having an externally replaceable acoustic liner. The exhaust duct includes a forward section that is configured to be axially coupled with a bulkhead collar on the aircraft, a body section that is coupled to the forward section and a stinger cap that includes the replaceable acoustic liner. The replaceable acoustic liner is configured to be slideably received by the body section.

22 Claims, 5 Drawing Sheets

U.S. PATENT DOCUMENTS

| | | | |
|---|---|---|---|
| 5,266,755 A * | 11/1993 | Chien | 181/252 |
| 5,363,641 A | 11/1994 | Dixon et al. | |
| 5,706,651 A * | 1/1998 | Lillibridge et al. | 60/262 |
| 5,758,488 A * | 6/1998 | Batey | 60/226.1 |
| 5,768,778 A * | 6/1998 | Anderson et al. | 29/888.01 |
| 5,791,138 A * | 8/1998 | Lillibridge et al. | 60/262 |
| 6,039,287 A * | 3/2000 | Liston et al. | 244/54 |
| 6,053,276 A * | 4/2000 | D'Amico et al. | 181/243 |
| 6,112,850 A * | 9/2000 | Secrest et al. | 181/224 |
| 6,209,679 B1 * | 4/2001 | Hogeboom et al. | 181/286 |
| 6,244,539 B1 * | 6/2001 | Liston et al. | 244/54 |
| 6,247,668 B1 | 6/2001 | Reysa et al. | |
| 6,308,915 B1 * | 10/2001 | Liston et al. | 244/54 |
| 6,415,887 B1 * | 7/2002 | Moran et al. | 181/264 |
| 6,581,874 B2 * | 6/2003 | Lemire et al. | 244/54 |
| 6,615,576 B2 | 9/2003 | Sheoran et al. | |
| 6,676,503 B2 * | 1/2004 | Hill et al. | 454/17 |
| 6,695,094 B2 | 2/2004 | Moffat et al. | |
| 6,966,187 B2 * | 11/2005 | Modi et al. | 60/752 |
| 6,968,701 B2 * | 11/2005 | Glahn et al. | 60/792 |
| 6,968,922 B2 * | 11/2005 | Kawamata et al. | 181/231 |
| 7,100,736 B2 * | 9/2006 | Flintham | 181/243 |
| 2002/0084381 A1 * | 7/2002 | Lemire et al. | 244/54 |
| 2002/0104707 A1 * | 8/2002 | Moffat et al. | 181/249 |
| 2002/0139120 A1 | 10/2002 | Sheoran et al. | |
| 2003/0150206 A1 * | 8/2003 | Glahn et al. | 60/39.15 |
| 2004/0238273 A1 * | 12/2004 | Fritskey et al. | 181/264 |
| 2005/0261387 A1 * | 11/2005 | Stevenson et al. | 521/99 |
| 2005/0268593 A1 * | 12/2005 | Hagshenas | 60/39.08 |
| 2006/0124384 A1 * | 6/2006 | Tary et al. | 181/243 |
| 2006/0260323 A1 * | 11/2006 | Moulebhar | 60/793 |
| 2006/0273221 A1 * | 12/2006 | Olsen et al. | 244/58 |
| 2007/0089396 A1 * | 4/2007 | Anderson | 60/200.1 |

FOREIGN PATENT DOCUMENTS

| | | |
|---|---|---|
| EP | 1 391 597 A2 | 2/2004 |
| GB | 2407343 A * | 4/2005 |

* cited by examiner

AUXILIARY POWER UNIT EXHAUST DUCT WITH MUFFLER INCORPORATING AN EXTERNALLY REPLACEABLE ACOUSTIC LINER

CROSS-REFERENCES TO RELATED APPLICATIONS

This application claims the benefit of U.S. Provisional Application No. 60/612,675 filed Sep. 23, 2004.

TECHNICAL FIELD

The present invention relates to an auxiliary power unit exhaust duct and, more particularly, to an exhaust duct incorporating an externally replaceable acoustic liner.

BACKGROUND

Many modern aircraft are equipped with an airborne auxiliary power unit ("APU") that provides electrical and pneumatic power to various parts of the aircraft for such tasks as environmental control, lighting, powering electronics, main engine starting, etc. In order to utilize an airborne APU various installation systems must be included with the APU. Some of the principle systems include mounts, inlet and exhaust, and pneumatic (bleed) and fire containment systems, including systems for detecting and extinguishing fires. FIG. 1 shows a typical airborne APU 100 installed in the tailcone of an aircraft (shown in dashed outline 105). Some of the key systems include an inlet system 110, a mounting system 115, a pneumatic system 120 and an exhaust system 125.

The exhaust system 125 performs many functions, including evacuating APU exhaust gas from the aircraft, attenuating exhaust noises, and providing compartment cooling airflow when used in conjunction with an eductor system. The functional design aspects of these duties are often integrated into a single exhaust muffler system to reduce weight. Unfortunately, the compromises between functionality, reliability, cost, and weight often result in an exhaust duct that will need repair work one or more times in its lifetime. The component of the exhaust duct that will most often need repair, or rather replacement, is the acoustic liner. This is because the thermal cycling and harsh environment that the acoustic liner is exposed to makes it rather brittle and subject to cracking. Because of potentially aggressive weight and cost targets, the design of an exhaust duct may not lend itself to simple and straightforward repair methods for replacing an acoustic liner. In addition, replacement of an acoustic liner typically requires removal of the APU 100 and exhaust system 125 from the aircraft, resulting in significant downtime for the operators of the aircraft.

Accordingly, there is a need for an exhaust duct and repair procedures that allow replacement of an acoustic liner on-wing, or from the outside of the aircraft, so that the useful life of the remainder of the exhaust duct can be extended. Furthermore, other desirable features and characteristics of the present invention will become apparent from the subsequent detailed description and the appended claims, taken in conjunction with the accompanying drawings and the foregoing technical field and background

BRIEF SUMMARY

The present invention provides an apparatus and method for an exhaust duct incorporating an externally replaceable acoustic liner. The exhaust duct disclosed allows for an acoustic liner to be replaced on-wing, or from the outside of the aircraft, without removing the entire exhaust duct from the aircraft.

In one embodiment, and by way of example only, an exhaust duct is disclosed that includes a forward section, a body section, and a stinger cap with replaceable acoustic liner. The forward section is configured to be axially coupled with a bulkhead collar on the aircraft. The body section is coupled to the forward section and the stinger cap with replaceable acoustic liner is configured to be slideably received by the body section.

In another embodiment, and by way of example only, an auxiliary power unit exhaust duct for use in an aircraft is disclosed that includes a forward section, a body section, and a stinger cap with replaceable acoustic liner. The forward section is configured to be axially coupled with a bulkhead collar on an aircraft and also includes a flow entrainment bellmouth. The body section is coupled to the forward section and includes an outer skin with a plurality of baffles. The stinger cap with replaceable acoustic liner is configured to be slideably received by the plurality of baffles of the body section. The replaceable acoustic liner is also slideably coupled to the bellmouth.

In still another embodiment, and by way of example only, a method of replacing an acoustic liner of an exhaust duct mounted in an aircraft is disclosed. The method includes uncoupling a stinger cap from the aircraft, the stinger cap having the acoustic liner and sliding the stinger cap with the acoustic liner out of the exhaust duct. Once the stinger cap is out, the acoustic liner is removed and a new acoustic liner is attached to the stinger cap. The stinger cap with the new acoustic liner is then inserted into the exhaust duct and coupled to the aircraft.

BRIEF DESCRIPTION OF THE DRAWINGS

The following drawings are illustrative of the particular embodiments of the invention and therefore do not limit its scope. They are presented to assist in providing a proper understanding of the invention. The drawings are not to scale and are intended for use in conjunction with the explanations in the following detailed descriptions. The present invention will hereinafter be described in conjunction with the appended drawings, wherein like reference numerals denote like elements, and.

DETAILED DESCRIPTION OF A PREFERRED EMBODIMENT

Figure 1:
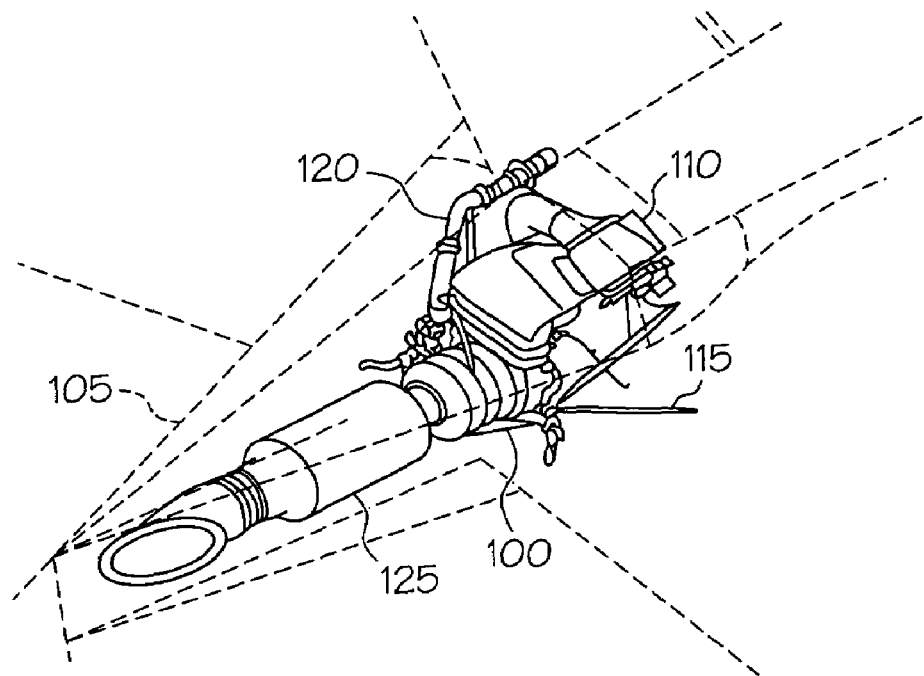
FIG. 1 shows a typical airborne auxiliary power unit installed in a tailcone of an aircraft.

The following detailed description of the invention is merely exemplary in nature and is not intended to limit the invention or the application and uses of the invention. Furthermore, there is no intention to be bound by any expressed or implied theory presented in the preceding technical field, background, brief summary or the following detailed description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Also, the use of "inside diameter," "outside diameter," "circumference," or "cylinder" or any other variation thereof, or references to the circumferential geometry of the present invention are used to described the preferred embodiment of the inventions. Other envelopes, such as elliptical, conical, ellipto-conical, or polygonal, and other variations and combinations are intended to be within the scope of this disclosure. When "outside diameter" is used in reference to a "cylinder" it should be understood that the equivalent surface/feature of an alternate envelope geometry is also implied.

The invention may be described herein in terms of components and various processing steps. Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The present invention is directed to an exhaust duct that incorporates an externally replaceable acoustic liner that can be removed and replaced without removing the exhaust duct from the aircraft. The exhaust duct incorporates into a single unit the functional details required to provide:

A flow path to allow auxiliary power unit ("APU") exhaust gases to safely exit the aircraft;

A flow entrainment bellmouth for an eductor system;

Sound attenuation to reduce acoustic signature of the APU;

Mounting provisions that accommodate radial and axial thermal growth.

Figure 2:
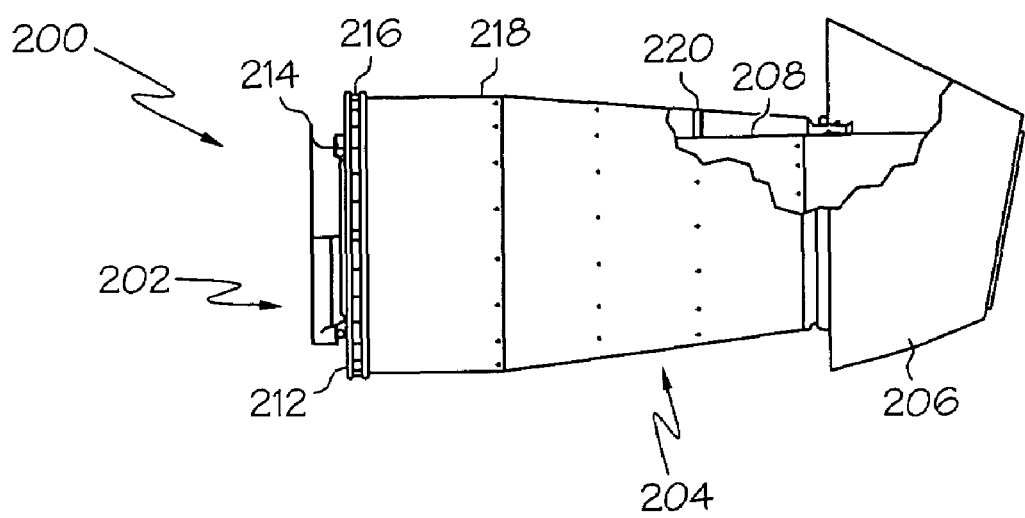
FIG. 2 shows a side view of one embodiment of an exhaust duct.
Figure 3:
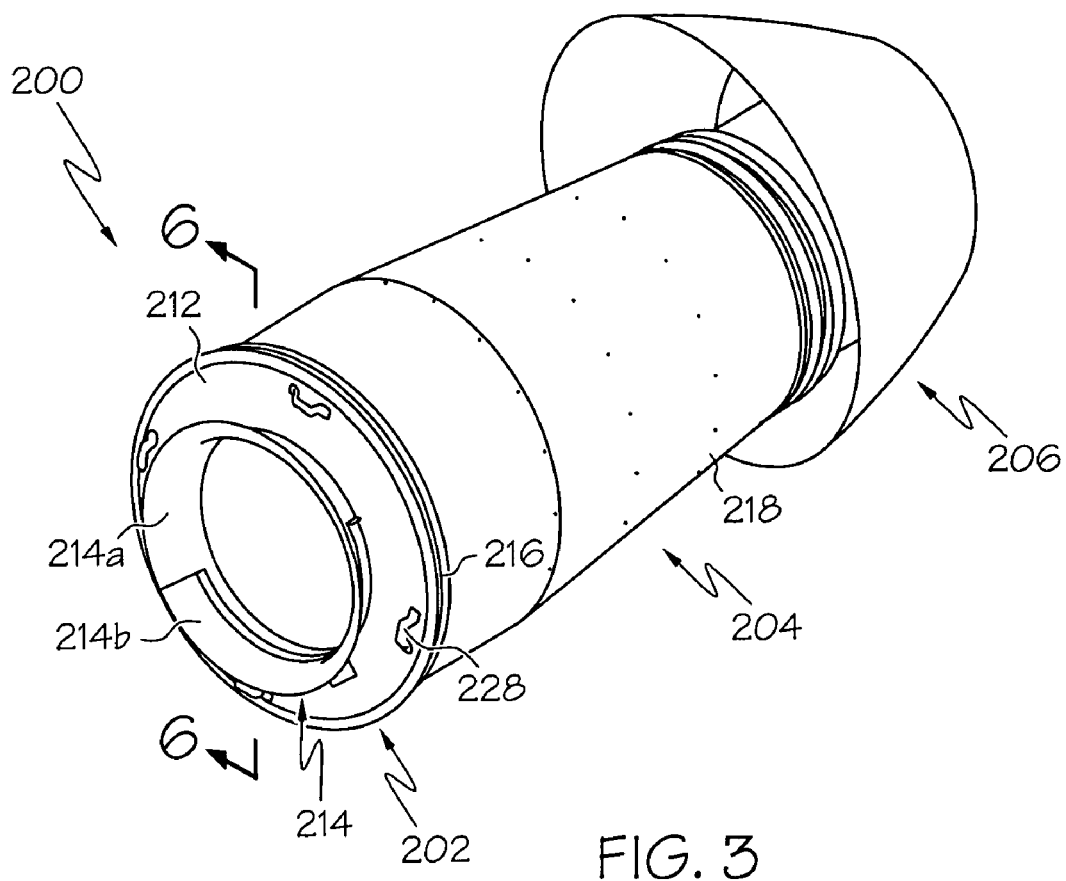
FIG. 3 shows a front isometric view of the exhaust duct of FIG. 2.

FIG. 2 shows a side view and FIG. 3 shows a front isometric view of one embodiment of an exhaust duct 200 which includes a forward section 202, a body section 204, and an aft aircraft interface or stinger cap 206. Each primary area of the exhaust duct 200 and the key features are described in detail in the following paragraphs. In FIG. 2, a portion of outer skin 218 of the exhaust duct 200 has been cut away to reveal the acoustic liner 208 and one of the plurality of baffles 220 inside. The various sections of the exhaust duct 200, and details therein, can be joined together by a number of means, including, but not limited to, welding, brazing, bonding, and fasteners, such as rivets, or bolts. The exhaust duct 200 may use one or more of these methods to assemble the part.

Figure 4:
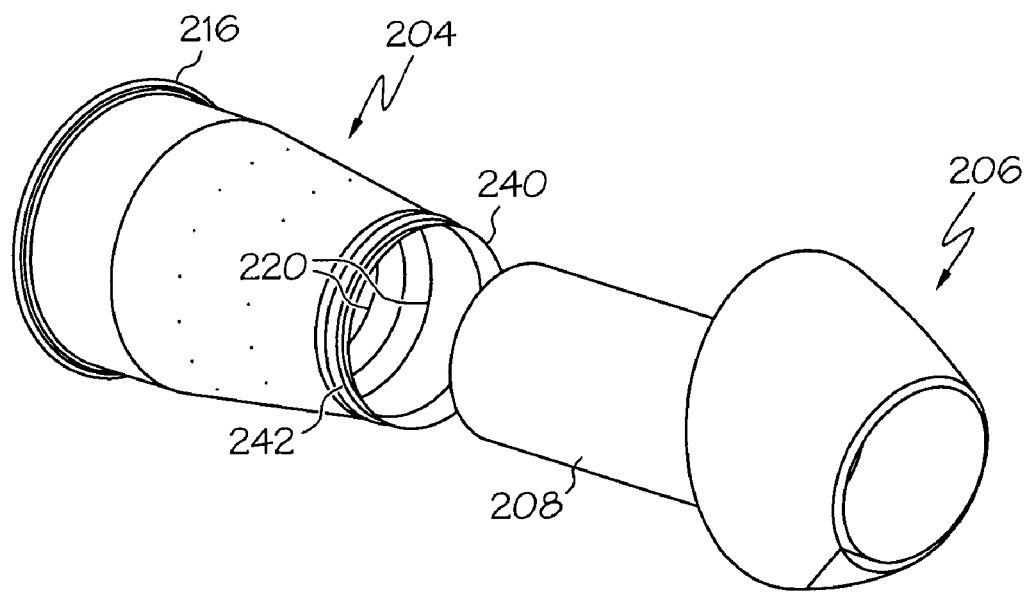
FIG. 4 is a rear isometric view of the exhaust duct in FIG. 2 showing how the stinger cap may be removed from the body section.

FIG. 4 shows a rear isometric view of the exhaust duct 200 with the stinger cap 206 and acoustic liner 208 slid from the body section 204. This allows the removal and replacement of the acoustic liner 208 in an exhaust duct 200 that is replaceable on-wing, or from the outside of the aircraft.

Figure 5:
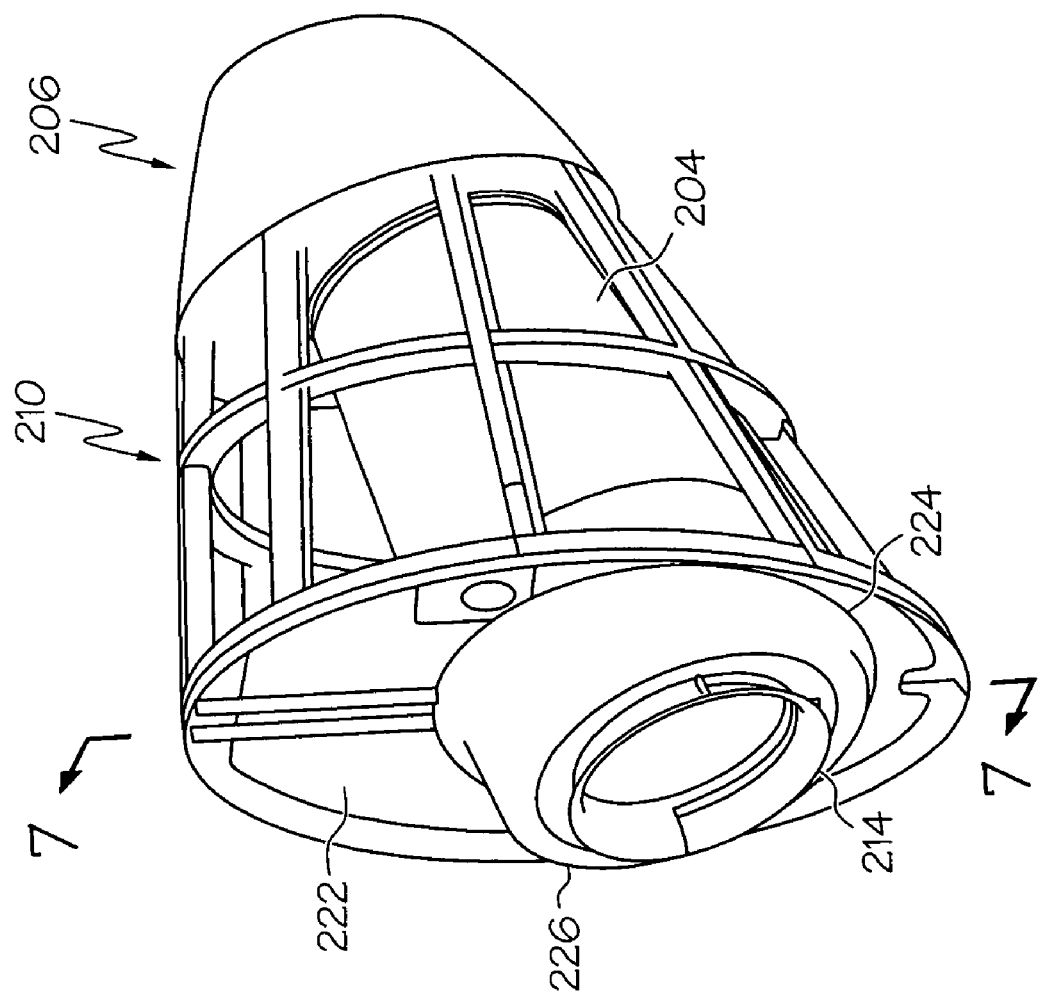
FIG. 5 is an isometric view showing an exhaust duct installed in a representative aircraft tailcone.

FIG. 5 shows an isometric view of the exhaust duct 200 installed in a representative aircraft tailcone 210. The skin of the aircraft, as well as some of the minor details of the tailcone 210 such as rivets, joining brackets, etc., have been omitted to provide better visibility to the exhaust duct.

Referring again to FIG. 3, the forward section 202 of the exhaust duct 200 includes axially fixed mounting provisions 228 to allow the exhaust duct 200 to be installed in the aircraft, and a forward end cap 212. The eductor components are a two piece bellmouth 214 and a flow inhibitor 216. The bellmouth 214 is a formed sheet metal nozzle that allows the high energy APU exhaust gasses to entrain the APU compartment air into the exhaust flow to provide cooling for the APU compartment. The two sections of the bellmouth have identical functional geometry in regards to flow and differ in that one section 214a is permanently fixed to the exhaust duct and one section 214b is attached by means of threaded fasteners. This allows the APU to be installed and removed from the aircraft without the need to remove the exhaust duct.

Figure 6:
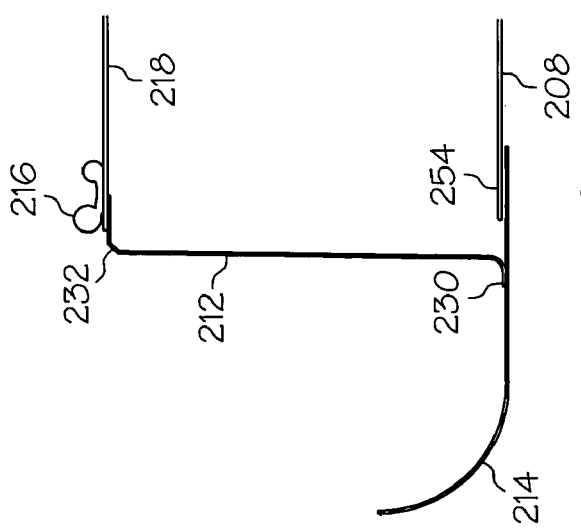
FIG. 6 is a cross-sectional view taken at 6 in FIG. 3 showing the interfaces of the forward end cap.

FIG. 6 is a cross-sectional view taken at 6 in FIG. 3 showing the interfaces of the forward end cap 212. The forward end cap 212, a formed sheet metal component, provides footprint space for the axially fixed mounting provisions 228, and also provides attachment areas for the two bellmouth pieces and forms the envelope geometry of the forward portion of the exhaust duct. The fixed bellmouth 214a piece is directly attached 230 to the forward end cap 212 by welding, riveting, or other suitable means. The removable bellmouth piece 214b is attached to the forward end cap through ancillary brackets on the fixed bellmouth and on the forward end cap. A circumferential lip is also provided on the forward end cap 212 to receive the removable bellmouth piece. The outer skin 218, which is formed to match the geometry of the forward end cap 212, attaches 232 thereto via a welded or brazed joint, rivets, or any other suitable means capable of transmitting the required loads specific to a particular application.

Figure 7:
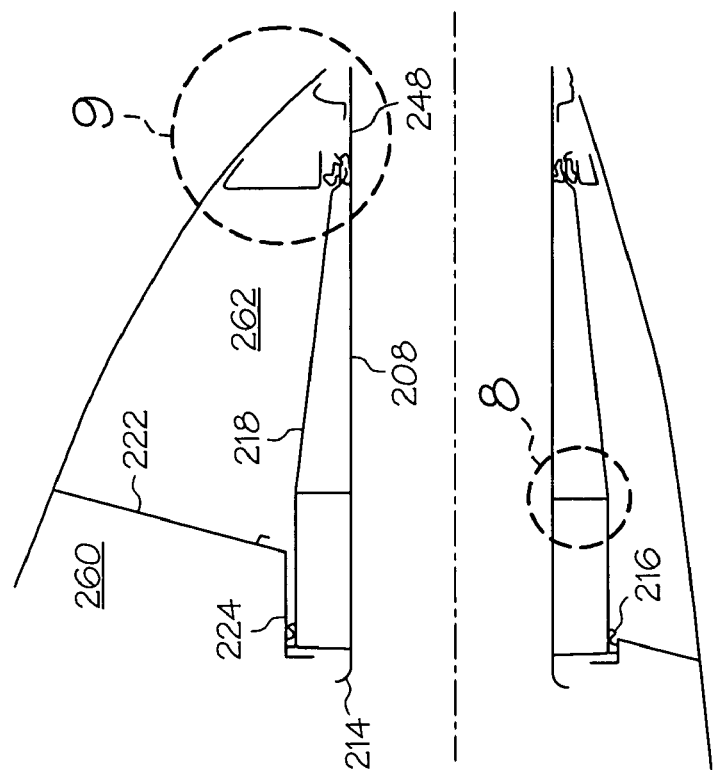
FIG. 7 is a cross-sectional view at 7 in FIG. 5 showing the exhaust duct and the interface with surrounding aircraft structure.

FIG. 7 is a cross sectional view at 7 in FIG. 5 showing the exhaust duct 200 and interface with surrounding aircraft structure. The body section 204 of the exhaust duct 200 is primarily comprised of the muffler section that includes a plurality of baffles 220, the outer skin 218 of the exhaust duct, and the portion of the exhaust gas flow path formed by the acoustic liner 208. The baffles 220 and outer skin 218 may be made of sheet metal. The baffles 220, which are similar in shape to the forward end cap 212, and the outer skin 218 form the envelope geometry of the body section of the exhaust duct as well as define the acoustic cavity for the muffler.

Figure 8:
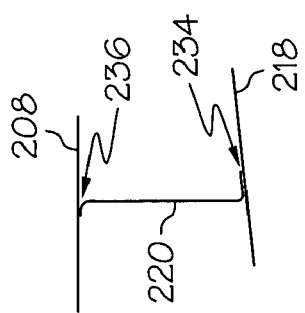
FIG. 8 shows a more detailed view of the baffles in FIG. 7.

FIG. 8 shows a more detailed view of the baffles in FIG. 7. The joint 234 between the outer skin 218 and the baffles 220 can be riveted, welded, brazed, or any other suitable configuration. The inside geometry of the baffles 220 matches that of the flow path of the exhaust duct and is often circular in shape. The inside diameter of the baffles 220 is slightly larger than the outside diameter of the cylinder formed by the acoustic liner, this resulting in a small gap 236 between the baffles 220 and the acoustic liner 208. This gap 236, which is sized based on the thermal growth properties of the acoustic liner 208 and the baffles 220, allows radial and axial thermal growth of the acoustic liner 208. This gap 236 also allows the acoustic liner 208 to be slid into and out of the body section 204. Although the acoustic liner 208 is positioned inside the body section 204 of the exhaust duct 200, it is not directly attached to any of the components of the body section 204.

The flow inhibitor 216, which ideally is a compressible seal around the outer skin 218 of the exhaust duct 200, is used when the exhaust duct 200 is installed in a compartment other than an APU compartment 260. The bulkhead 222 that separates the APU compartment 260 and the exhaust duct compartment 262 will by necessity incorporate an opening to allow the eductor system to operate. To increase the efficiency of the eductor system, flow between the two compartments needs to be minimized. A bulkhead collar 224 that matches the outer shape (circular, elliptical, etc.) of the exhaust duct 200 is typically the most cost and weight effective method of interfacing the bulkhead 222 and the exhaust duct 200. This bulkhead collar 224 can easily accommodate 226 the axially fixed mounting provisions 228 as well as provide an effective interface for the flow inhibitor 216 to provide adequate flow separation between the two compartments. Being compressible, the flow inhibitor 216 also compensates for the radial thermal growth of the exhaust duct 200.

The axially fixed mounting provision accommodations 226 are arranged in an annular pattern relative to the bellmouth 214 on the forward end cap 212 of the exhaust duct. The axially fixed mounting provisions 228 and the accommodations 226 on the bulkhead collar 224 receive threaded fasteners to transmit the exhaust duct loads into the aircraft structure. The receiving devices for the fasteners, which ideally are industry standard nutplates, are allowed to float radially within small slots cut into brackets which are attached to the forward end cap 212 of the exhaust duct (see FIG. 3). The use of these brackets allows the forward end cap 212 of the exhaust duct to remain free of openings, thereby further increasing the efficiency of the eductor system.

Figure 9:
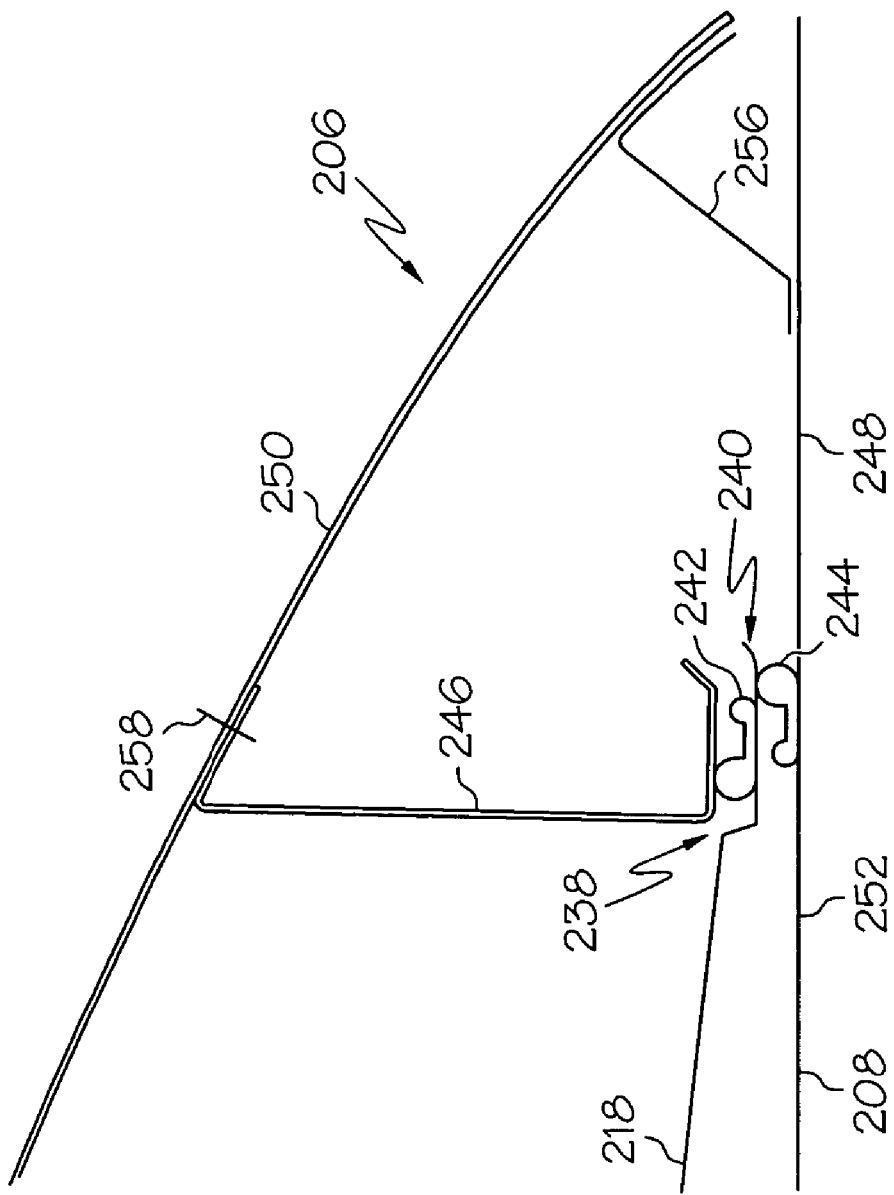
FIG. 9 shows a more detailed view of the aft support area of the exhaust duct in FIG. 7.

FIG. 9 shows a more detailed view of the exhaust duct 200 and aircraft structure in FIG. 7, which provides support not only for the body section 204 of the exhaust duct, but for the stinger cap section 206 as well. Along with providing structural support for the various portions of the exhaust duct, the aft support structure must also accommodate the radial and axial thermal growth of the exhaust duct as a whole. To accomplish this, the aft support structure is comprised of two pieces, an aft end cap 238 and a compressible support seal 242 similar to the one used as the flow inhibitor 216. The outermost geometry of the aft end cap 238 matches that of the outer skin 218 and is attached thereto by a similar means as for the forward end cap 212. Additionally, the aft end cap 238 provides a seal leg 240, the outside diameter of which accommodates the compressible support seal 242, while the inside diameter interfaces with a similar compressible seal 244 attached to the exhaust pipe 248 of the stinger cap 206. To support the aft portion of the exhaust duct, the aircraft structure must supply a support frame 246 similar to that used to support the forward section of the exhaust duct, except that there is no need to accommodate any axially fixed mounting provisions.

The stinger cap 206 of the exhaust duct 200 is comprised of the acoustic liner 208, exhaust pipe 248, and structural skin member 250. The acoustic liner 208 is made of acoustically permeable material such as feltmetal or perfmetal. Typically cylindrical in shape, the acoustic liner 208 runs the length of the muffler section of the exhaust duct 200, from just aft of the bellmouth 214 to just forward of the exhaust duct end cap 238. As previously discussed, the acoustic liner 208 does not directly fasten to the baffles 220 in the muffler, nor does it fasten at the forward end to the bellmouth 214. Like the forward end cap 212 of the exhaust duct 200, the acoustic liner 208 is axially fixed at only one end, to the exhaust pipe 248 and is allowed to float at the other end over the bellmouth 214 to accommodate axial and radial thermal growth (see gap 254 in FIG. 7). The exhaust pipe 248, which is of a shape similar to the acoustic liner 208 and of similar diametric dimensions, provides the flowpath from the muffler section of the exhaust duct to the outside of the aircraft. The exhaust pipe 248 and acoustic liner 208 are joined by fixed or threaded fasteners 252 that allow for easy removal of the acoustic liner 208 from the exhaust pipe 248. Attached circumferentially to the exhaust pipe 248 is compressible seal 244, similar to the flow inhibitor 216. This compressible seal 244 interfaces with the seal leg 240 of the aft end cap 238 of the exhaust duct 200 to provide support for the exhaust pipe 248 and acoustic liner 208 while permitting thermal growth between the exhaust pipe 248 and aft end cap 238 of the exhaust duct. Attached to the aft end of the exhaust pipe 248, near the exit plane, is a formed or machined structural channel 256 whose inner geometry matches the exhaust pipe 248 and whose outer geometry matches the loft line of a particular aircraft application. Attached to the outer surface of this channel 256 is a structural skin member 250 that also matches the loft line of the aircraft utilizing the exhaust duct 200. The structural skin member 250 extends forward from the exit plane of the exhaust pipe 248 to a support frame 246 on the aircraft. This support frame 246 can be a dedicated frame for the support of the stinger cap 206 or it can be integrated into other support structures. The structural skin member 250 may incorporate stiffening ribs as required to fully support the exhaust pipe 248 and acoustic liner 208. The exhaust pipe 248, structural channel 256, and structural skin member 250 are attached to one another via rivets, welding, or any other suitable means capable of supporting the required loads of a particular application. The structural skin member 250, and hence the entire stinger cap assembly 206, are attached to the support frame 246 via threaded fasteners 258.

To remove the acoustic liner 208 from exhaust duct 200, the stinger cap 206 is the only component that needs to be removed. The unique design disclosed for the exhaust duct 200 allows for removal of the acoustic liner 208 externally from the outside of the aircraft without removing the entire exhaust duct 200. As discussed above, the acoustic liner 208 is part of the stinger cap 206, along with the exhaust pipe 248 and the structural skin member 250. To remove the stinger cap 206, the threaded fasteners 258 holding the structural skin member 250 to the support frame 246 on the aircraft are removed. Since the threaded fasteners 258 are the only attachment of the stinger cap 206 to the aircraft, the stinger cap 206 and acoustic liner 208 may then be slid out of the exhaust duct 200 (see FIG. 4). Once removed, the acoustic liner 208 may then be removed from the stinger cap 206 by unfastening fasteners 252 holding the acoustic liner 208 to the exhaust pipe 248. A new acoustic liner 208 may then be attached to the exhaust pipe 248 using fasteners 252. The stinger cap 206 with new acoustic liner 208 is then slid into the exhaust duct 200 on the aircraft and the structural skin member 250 is attached to the support frame 246 using threaded fasteners 258.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An exhaust duct for use in an aircraft, comprising:
    a forward section configured to be axially coupled with the aircraft;
    a body section coupled to the forward section; and
    a stinger cap with an acoustic liner, the acoustic liner configured to be slideably received by the body section, and replaceable from outside the aircraft.

2. The exhaust duct of claim 1, wherein the acoustic liner is formed from acoustically permeable material.

3. The exhaust duct of claim 2, wherein the acoustically permeable material is feltmetal or perfmetal.

4. The exhaust duct of claim 1, wherein the stinger cap further includes a structural skin member configured to be structurally coupled with an aircraft support frame.

5. The exhaust duct of claim 1, wherein the stinger cap further includes an exhaust pipe, the acoustic liner being removably coupled to the exhaust pipe.

6. The exhaust duct of claim 1, wherein the forward section includes a bellmouth configured to slideably receive the acoustic liner.

7. The exhaust duct of claim 1, wherein the body section includes a muffler section having an outer skin with a plurality of baffles, the plurality of baffles being configured to slideably receive and support the acoustic liner.

8. The exhaust duct of claim 7, wherein the body section further includes a flow inhibitor mounted on the outer skin, the flow inhibitor configured to sealingly engage a bulkhead collar on the aircraft.

9. The exhaust duct of claim 7, wherein the body section further includes an aft seal leg attached to the outer skin and a first compressible seal mounted thereon, the compressible seal being configured to sealingly engage a support frame on the aircraft.

10. The exhaust duct of claim 9, wherein the stinger cap includes a second compressible seal configured to sealingly engage the aft seal leg.

11. An auxiliary power unit exhaust duct for use in an aircraft, comprising:
    a forward section configured to be axially coupled with the aircraft, the forward section having a flow entrainment bellmouth;
    a body section coupled to the forward section, the body section having an outer skin and a plurality of baffles; and
    a stinger cap with a replaceable acoustic liner, the replaceable acoustic liner being configured to be slideably received by the plurality of baffles of the body section and be slideably coupled to the bellmouth.

12. The exhaust duct of claim 11, wherein the acoustic liner is formed from acoustically permeable material.

13. The exhaust duct of claim 12, wherein the acoustically permeable material is feltmetal or perfmetal.

14. The exhaust duct of claim 11, wherein the stinger cap further includes a structural skin member configured to be structurally coupled with an aircraft support frame.

15. The exhaust duct of claim 11, wherein the stinger cap further includes an exhaust pipe, the replaceable acoustic liner being removably coupled to the exhaust pipe.

16. A method of externally replacing an acoustic liner of an exhaust duct mounted in an aircraft, comprising:
    sliding a stinger cap with the acoustic liner out of the exhaust duct;
    uncoupling the acoustic liner from the stinger cap;
    coupling a new acoustic liner to the stinger cap; and
    inserting the stinger cap with the new acoustic liner into the exhaust duct.

17. The method of claim 16, further comprising uncoupling the stinger cap from the aircraft.

18. The method of claim 17, wherein uncoupling the stinger cap from the aircraft includes unfastening a structural skin member of the stinger cap from an aircraft support frame.

19. The method of claim 16, wherein uncoupling the acoustic liner from the stinger cap includes uncoupling the acoustic liner from an exhaust pipe of the stinger cap.

20. The method of claim 16, wherein coupling a new acoustic liner to the stinger cap includes fastening the new acoustic liner to an exhaust pipe of the stinger cap.

21. The method of claim 16, further comprising coupling the stinger cap to the aircraft.

22. The method of claim 21, wherein coupling the stinger cap to the aircraft includes fastening a structural skin member of the stinger cap to an aircraft support frame.

* * * * *